3,014,936
15-DEHYDRO-CORTICAL HORMONES
Octavio Mancera, Howard J. Ringold, and Carl Djerassi, all of Mexico City, Mexico, assignors to Syntex S.A., Mexico City, Mexico, a corporation of Mexico
No Drawing. Filed Feb. 11, 1960, Ser. No. 8,000
Claims priority, application Mexico May 9, 1959
27 Claims. (Cl. 260—397.45)

The present invention relates to new cyclopentanophenanthrene derivatives.

More specifically it relates to novel steroidal $\Delta^{15}$-cortical hormones of the formulas:

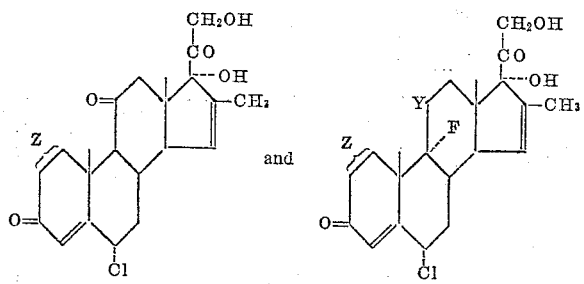

wherein R is selected from the group consisting of hydrogen and the acyl radical of a hydrocarbon carboxylic acid having up to 12 carbon atoms; Y is selected from the group consisting of =O and

and Z represents the linkage between C–1 and C–2 selected from the group consisting of single bond and double bond.

The hydrocarbon carboxylic acid from which the aforesaid acyl radical is derived is either saturated or unsaturated, of straight, branched, cyclic or mixed straight (branched)-cyclic chain, which acids may be substituted with groups such as hydroxyl, O-acyl (of less than 12 carbon atoms), alkoxy (of less than 9 carbon atoms), amino or halogen (fluorine, chlorine or bromine); typical esters among the novel compounds are the acetate, propionate, butyrate, hemisuccinate, enanthate, caproate, benzoate, trimethylacetate, phenoxyacetate, aminoacetate and $\beta$-chloropropionate.

The acyl groups may further derive from sulfonic acids or from sulfuric acid; the new compounds can also be under the form of derivatives soluble in water, such as for example the alkali salts of their hemisuccinates, the disodium salts of their esters formed with phosphoric acids, or the hydrohalides of esters formed with amino-acids.

These new 6$\alpha$-chloro-$\Delta^{15}$-compounds are hormones of cortical activity and are especially anti-inflammatory and catabolic agents.

The new hormones of this class were produced from the 21-esters, preferably the acetates of 16-methyl-15-dehydro-cortisol or 16-methyl-15-dehydro-cortisone or their 9$\alpha$-fluorinated derivatives by a process illustrated in Reaction Diagram I below, in which X is either hydrogen or fluorine and $Y^1$ is =O when X is hydrogen and is selected from the group consisting of =O and

when X is fluorine.

REACTION DIAGRAM I

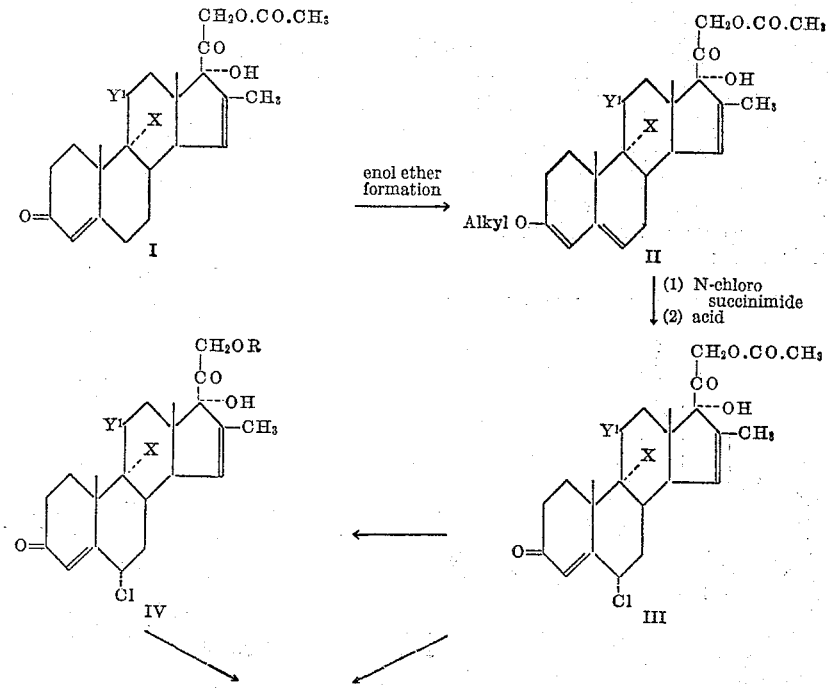

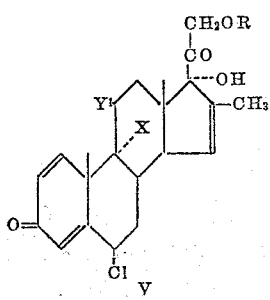
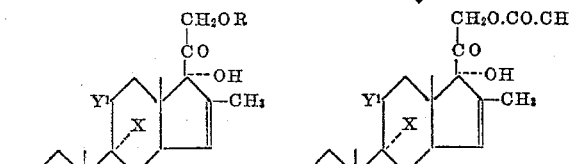
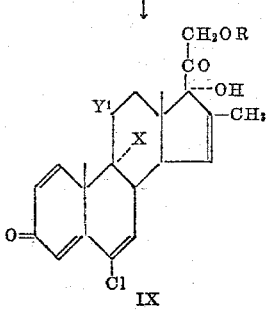

The 21-acetates of 16-methyl-15-dehydro-cortisone, of 9α-fluoro-16-methyl-15-dehydrocortisol, or of 9α-fluoro-16-methyl-15-dehydro-cortisone (compound I) were converted to their 3-enol-ethers (II) and the latter then treated with N-chlorosuccinimide in a buffered solvent. By subsequent acid treatment there were obtained the 21-acetates of the respective 16-methyl-$\Delta^{4,15}$-6α-chlorohormones (III); there were then optionally applied the introduction of additional double bonds and/or the hydrolysis of the 21-acetoxy group and/or the reesterification of the free hydroxyl group at C-21, to produce compounds of the above Formulas IV and V.

The starting materials (I) are obtained as described in our co-pending patent application No. 7,999, filed February 11, 1960.

Another group of steroidal $\Delta^{15}$-hormones according to the invention is characterized by the formulas:

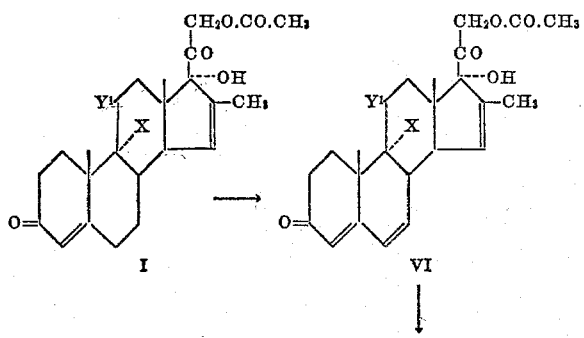

in which R, Y and Z have the same meaning as explained hereinbefore.

The compounds of this new group are also hormones showing corticoid activity and being in particular thymolytic agents.

These new compounds are obtained from the new compounds of Formulas IV and V by treatment with chloranil, whereby an additional double bond is introduced between C-6 and C-7.

Alternatively, the 16 - methyl - 6-chloro-$\Delta^{4,6}$-cortical hormones, with or without fluorine at C-9α, are obtained by a process illustrated by the following Reaction Diagram II, wherein X and Y$^1$ have the same meaning as hereinbefore:

REACTION DIAGRAM II

According to this process the 21-acetates of the respective $\Delta^{4,15}$-hormones without a halogen substituent at C-6, which are produced as described in our co-pending patent application Serial No. 7,999, filed February 11, 1960, were refluxed with chloranil in mixture with ethyl acetate and acetic acid or in xylene to produce compounds VI having a new double bond at C-6,7; these compounds were then treated with 1.1 molar equivalents of perbenzoic acid at low temperature, which oxidation resulted mainly in the formation of the 6α,7α-epoxide (VII) which was separated from the secondary compounds (6β,7β-epoxide and 6,7,15, 16-bis epoxide) by chromatography. By reaction with dry hydrogen chloride in glacial acetic acid, there were formed the 21-acetates of the respective 16-methyl-6-chloro-$\Delta^{4,6,15}$-hormones (VIII). When opening the epoxide ring of the acetate of 6,15-bis-dehydro-cortisols, it is convenient to protect temporarily such compounds by esterification of their respective 11β-hydroxyl group, preferably with trifluoroacetic acid, in order to avoid dehydration to the 9(11)-unsaturated compounds.

The acetates characterized by Formula VIII can be converted by conventional saponification to the free alcohols and/or reesterified to 21-esters other than the acetates; by refluxing the 21-esters (VIII) with selenium dioxide there were obtained the 21-esters of the respective 1,4,6,15-tetraenes (IX).

The invention is further illustrated but not limited by the following examples:

*Example 1*

To a suspension of 5 g. of the 21-acetate of 16-methyl-15-dehydro-cortisone in 50 cc. of anhydrous dioxane was added 5 cc. of ethyl orthoformate and 150 mg. of p-toluene-sulfonic acid and the mixture was stirred for 1 and a half hours; 4 cc. of pyridine and 100 cc. of water were added little by little with stirring and cooling, and the precipitate was collected, washed with water to neutral and dried. Recrystallization from methanol-water afforded the 3-ethyl enol ether of the 21-acetate of 16-methyl-15-dehydro-cortisone.

A mixture of 5 g. of the above enol ether, 2 g. of anhydrous sodium acetate and 100 cc. of acetone was treated with 32 cc. of water and the solution was cooled to a temperature between 0 and 5° C.; there was then added 3.9 g. of N-chlorosuccinimide and 2 cc. of glacial acetic acid and the mixture was stirred between 0 and 5°

C. for 30 minutes. It was then diluted with 300 cc. of water, kept standing overnight in the refrigerator and the precipitate formed was collected, washed with water, dried under vacuum and recrystallized from acetone. There was thus obtained the 21-acetate of 16-methyl-6β-chloro-15-dehydro-cortisone.

A slow stream of dry hydrogen chloride was introduced for 2 hours into a suspension of 3 g. of the above compound in 50 cc. of glacial acetic acid maintaining the temperature at 15° C.; after pouring into water (100 cc.) containing 20 g. of potassium acetate, the mixture was cooled and the precipitate was collected, washed with water, dried and recrystallized from acetone-hexane. There was thus obtained the 21-acetate of 16-methyl-6α-chloro-15-dehydro-cortisone.

A mixture of 2 g. of the above compound and 100 cc. of 1% methanolic potassium hydroxide solution was stirred at 5° C. for 1 hour, acidified with acetic acid, concentrated to a small volume, diluted with water and the precipitate was collected, washed with water, dried and recrystallized from acetone-hexane, thus affording 16-methyl-6α-chloro-15-dehydro-cortisone.

The starting material, namely 16-methyl-15-dehydro-cortisone was obtained from 16-methyl-$\Delta^{5,16}$-pregnadien-3β-ol-20-one-acetate, described by Wettstein et al, in Helv. Chem. Acta, XXVII, 1803 (1944). Epoxidation of this compound with hydrogen peroxide in alkaline medium, followed by treatment of the 16α,17α-epoxide with hydrobromic acid in acetone solution furnished 16-methyl-$\Delta^{5,15}$-pregnadiene-3β,17α-diol-20-one, that was acetoxylated at C-21, by the method described by Ringold and Stork in J. Am. Chem. Soc. 80, 250 (1958), thus producing 16-methyl-$\Delta^{5,15}$-pregnadiene - 3β,17α,21-triol-21-monoacetate. Oxidation of the above compound with chromium trioxide in acetone solution followed by treatment with 1% methanolic potassium hydroxide gave 16-methyl-$\Delta^{4,15}$-pregnadiene-17α-21-diol-3,20-dione. Upon incubation of the above compound with bovine adrenal glands there was obtained 16-methyl-15-dehydro-hydrocortisone.

The above compound was acetylated at C-21 and then oxidized with chromium trioxide in acetic acid, to produce 16-methyl-15-dehydro-cortisone acetate.

This procedure has been described in detail in our copending patent application Serial No. 7,999, filed in February 11, 1960.

*Example 2*

A solution of 5 g. of 16-methyl-6α-chloro-15-dehydro-cortisone, obtained as described in the previous example, in 20 cc. of pyridine, was treated with 10 cc. of propionic anhydride and kept overnight at room temperature; it was then poured into water, heated for half an hour in the steam bath, cooled, and the precipitate was collected, washed with water, dried and recrystallized from acetone-hexane, thus affording the propionate of 16-methyl-6α-chloro-15-dehydro-cortisone.

A mixture of 1 g. of the above compound, 50 cc. of t-butanol, 300 mg. of selenium dioxide and a few drops of pyridine was refluxed for 48 hours under an atmosphere of nitrogen, diluted with ethyl acetate and filtered through celite. The solvent was removed by distillation under reduced pressure, the residue was triturated with water and the precipitate was collected, washed with water and purified by chromatography on neutral alumina, to produce the 21-propionate of 16-methyl-6α-chloro-15-dehydro-prednisone. Part of this substance was hydrolyzed to the free 16-methyl-6α-chloro-15-dehydro-prednisone by the reaction with methanolic potassium hydroxide described above.

A mixture of 500 mg. of the propionate of 16-methyl-6α-chloro-15-dehydro-prednisone, 1 g. of chloranil, 12.5 cc. of ethyl acetate and 2.5 cc. of glacial acetic acid was refluxed under an atmosphere of nitrogen for 55 hours. The cooled mixture was washed with 5% aqueous sodium hydroxide solution until the washings were colorless and then with water to neutral, dried over anhydrous sodium sulfate and the solvent was evaporated under reduced pressure. By chromatography of the residue on neutral alumina, there was obtained the 21-propionate of 16-methyl-6-chloro-6,15-bis-dehydro-prednisone.

*Example 3*

By following the dehydrogenation method with chloranil in mixture with ethyl acetate and glacial acetic acid, 1 g. of 16-methyl-6α-chloro-15-dehydro-cortisone acetate, obtained as described in Example 1, was converted into the corresponding 6-dehydro derivative, i.e. 16-methyl-6-chloro-6,15-bis-dehydro-cortisone acetate.

By applying the saponification method described in Example 1, there was hydrolyzed the 21-acetoxy group and the resulting 16 - methyl-6-chloro-6,15-bis-dehydro-cortisone was reesterified by reaction with an excess of cyclopentylpropionic anhydride in pyridine solution, following a conventional method of acylation. There was thus obtained the 21-cyclopentylpropionate of 16-methyl-6-chloro-6,15-bis-dehydro-cortisone.

*Example 4*

A mixture of 500 mg. of the 21-acetate of 16-methyl-6α-chloro-15-dehydro-cortisone, obtained as described in Example 1, 25 cc. of t-butanol and 1 g. of chloranil was refluxed for 8 hours and the reaction mixture was allowed to stand at room temperature overnight. The excess of chloranil was then filtered and the solution evaporated under vacuo. The residue was dissolved in 500 cc. of ethyl acetate and the organic solution washed with 5% aqueous sodium hydroxide solution and water, as set forth above, dried over anhydrous sodium sulfate and evaporated to dryness. The residue was chromatographed on neutral alumina, thus yielding the acetate of 16-methyl-6-chloro-6,15-bis-dehydro-cortisone, identical with that obtained in Example 3.

Treatment of the above compound with selenium dioxide, in t-butanol, in accordance with the method described in Example 2, gave the 21-acetate of 16-methyl-6-chloro-6,15-bis-dehydro prednisone.

*Example 5*

In accordance with the method described in Example 1, 5 g. of the 21-acetate of 9α-fluoro-16-methyl-15-dehydro-hydrocortisone was converted into the corresponding enol ether, which, upon treatment with N-chlorosuccinimide gave the 21-acetate of 6β-chloro-9α-fluoro-16-methyl-15-dehydro-hydrocortisone, this compound was then isomerized to the 21-acetate of 6α-chloro-9α-fluoro-16-methyl-15-dehydro-cortisol, by treatment with dry hydrogen chloride in acetic acid.

A solution of 2 g. of the above compound in 50 cc. of glacial acetic acid was slowly treated under stirring with a solution of 500 mg. of chromium trioxide in 10 cc. of 50% acetic acid, taking care that the temperature remained below 15° C. It was then stirred at this temperature for 1 hour more, poured into ice water and the precipitate was collected, washed with water, dried and recrystallized from acetone-hexane, thus affording the 21-acetate of 6α-chloro-9α-fluoro-16-methyl-15-dehydro-cortisone.

Saponification of the latter compound with 1% methanolic potassium hydroxide, in accordance with the method of Example 1, give 6α-chloro-9α-fluoro-16-methyl-15-dehydro-cortisone.

The starting material, 21-acetate of 9α-fluoro-16-methyl-15-dehydro-cortisol was obtained from $\Delta^{16}$-pregnen-3α-ol-11,20-dione, which was converted into the 20-cycloethyleneketal; the 11-keto function was then reduced with lithium aluminium hydride in tetrahydrofurane; hydrolysis of the ketal group with p-toluenesulfonic acid in acetone gave 16-dehydro-pregnen-3α,11β-diol-20-one.

Treatment of the latter compound with an ether solution of diazomethane, followed by thermal decomposition of the pyrazoline, in accordance with the method described by Wettstein et al. in Helv. Chem. Acta, XXVII, 1803 (1944), afforded 16-methyl-Δ16-pregnene-3α,11β-diol-20-one. The above compound was acetylated at C-3 and dehydrated via the 11-mesylate, in accordance with the method described by Fried et al. in J. Am. Chem. Soc. 79, 1130 (1957), to produce 16-methyl-Δ9(11),16-pregnadien-3α-ol-20-one-3-monoacetate. Saponification of the above compound, followed by oxidation with chromium trioxide in acetic acid gave 16-methyl-Δ9(11)16-pregnadiene-3,20-dione. By applying the method described by Fried et al. in J. Am. Chem. Soc. 79, 1130 (1959), the latter compound was converted into 16-methyl-9α-fluoro-Δ16-pregnen-11β-ol-3,20-dione, which was treated with hydrogen peroxide in alkaline medium, and the resulting 16α,17α-epoxide, upon treatment with hydrobromic acid in acetone solution furnished 16-methyl-9α-fluoro-15-dehydro-pregnene-11β,17α-diol-3,20-dione.

The latter compound was acetoxylated at C-21, by the method described by Ringold and Stork in J. Am. Chem. Soc. 80, 250 (1958), thus producing 16-methyl-9α-fluoro-15-dehydro-pregnene-11β,17α,21-diol - 3,20 - dione - 21-acetate. Dehydrogenation of this compound with selenium dioxide in t-butanol and in the presence of a small amount of pyridine gave 16-methyl-9α-fluoro-15-dehydrocortisol acetate.

This procedure has been described in detail in our copending patent application Serial No. 7,999, filed February 11, 1960.

Example 6

In accordance with the method of Example 2, 8 g. of the 21-acetate of 9α-fluoro-16-methyl-15-dehydro-hydrocortisone were treated with chloranil in mixture with acetic acid and ethyl acetate, to produce the 21-acetate of 9α-fluoro-16-methyl-6,15-bis-dehydro-hydrocortisone.

5 g. of the latter compound were dissolved in 200 cc. of pure chloroform and treated with a chloroform solution of perbenzoic acid containing 1.1 molar equivalents of the reagent and kept at 0° C. for 98 hours. The mixture was then washed with 5% aqueous sodium bicarbonate solution and water, dried over anhydrous sodium sulfate and the solvent was evaporated. By chromatography of the residue on neutral alumina and elution with benzene-hexane there was obtained the 21-acetate of 16-methyl-9α-fluoro-6α,7α-oxido-Δ4,15-pregnadiene-11β,17α,21 - triol - 3, 20-dione.

A suspension of 5 g. of this epoxide in 50 cc. of glacial acetic acid was treated with 3.8 cc. of concentrated hydrochloric acid and the reaction mixture was heated on the steam bath; the solid material was dissolved within 5 minutes, and the solution was heated for 15 minutes further. It was then poured into ice salt water and the formed precipitate was collected. Crystallization from methylene chloride-hexane, after decolorization with activated charcoal, gave the 21-acetate of 16-methyl-6-chloro-9α-fluoro-6,15-bis-dehydro-cortisol. An additional crop was obtained after chromatography of the mother liquors.

By applying the dehydrogenation method described in Example 2, 2 g. of 16-methyl-6-chloro-9α-fluoro-6,15-bis-dehydro-cortisol 21-acetate were treated with selenium dioxide in t-butanol, thus producing the 21-acetate of 16-methyl-6-chloro-9α-fluoro - 6,15 - bis-dehydro-prednisolone.

Example 7

In accordance with the method described in Example 4, 5 g. of the 21-acetate of 9α-fluoro-16-methyl-15-dehydro-cortisol were treated with chloranil in t-butanol, thus producing the acetate of 9α-fluoro-16-methyl-6,15-bis-dehydro-cortisol, identical with that obtained in Example 6.

2 g. of the above compound were oxidized with chromium trioxide in acetic acid, by applying the method of Example 5, thus affording the acetate of 9α-fluoro-16-methyl-6,15-bis-dehydrocortisone.

In accordance with the method of Example 6, the above compound was treated with perbenzoic acid in chloroform solution, and the resulting epoxide was converted to the 21-acetate of 16-methyl-6-chloro-9α-fluoro-6,15-bis-dehydrocortisone, by reaction with hydrochloric acid in acetic acid. Treatment of the latter compound with 1% methanolic potassium hydroxide solution gave 16-methyl-6-chloro-9α-fluoro-6,15-bis-dehydrocortisone.

Example 8

A solution of 1 g. of 16-methyl-6-chloro-9α-fluoro-6,15-bis-dehydro-cortisone, obtained as described in the previous example, in 5 cc. of pyridine, was treated with 5 cc. of cyclopentylpropionic anhydride, in accordance with the method of Example 3, thus affording the 21-cyclopentylpropionate of 16 - methyl-6-chloro-9α-fluoro-6,15-bis-dehydro-cortisone.

By subsequent reflux with selenium dioxide in mixture with t-butanol, by applying the method of Example 2, there was obtained the 21-cyclopentylpropionate of 16-methyl-6-chloro-9α-fluoro-6,15-bis-dehydro-prednisone.

Example 9

By following the dehydrogenation method of Example 2, 6α-chloro-9α-fluoro-16-methyl-15-dehydro-cortisol 21-acetate, prepared as described in Example 5, was treated with selenium dioxide in t-butanol, thus producing the 21-acetate of 6α - chloro-9α-fluoro-16-methyl - 15 - dehydro-prednisolone.

The above compound was oxidized with chromium trioxide in acetic acid in accordance with the method of Example 5, to produce the 21-acetate of 6α-chloro-9α-fluoro-16-methyl - 15 - dehydro - prednisone. There was then hydrolyzed the 21-acetoxy function and the hydroxyl group at C-21 was reesterified with propionic anhydride, thus affording the propionate of 6α-chloro-9α-fluoro-16-methyl-15-dehydro-prednisone.

We claim:
1. A compound of the formula

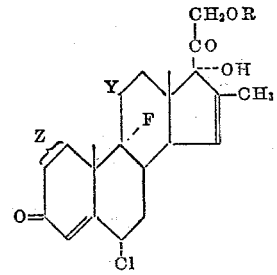

wherein R is selected from the group consisting of hydrogen and the acyl radical of a hydrocarbon carboxylic acid having up to 12 carbon atoms; Y is selected from the group consisting of =O and

and Z represents the linkage between C-1 and C-2 selected from the group consisting of a single bond and a double bond.

2. A compound of the formula

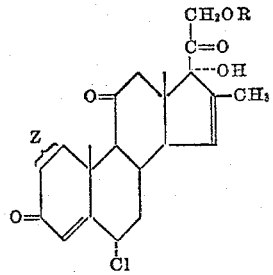

wherein R is selected from the group consisting of hydrogen and the acyl radical of a hydrocarbon carboxylic acid having up to 12 carbon atoms; and Z represents the linkage between C-1 and C-2 selected from the group consisting of single bond and double bond.

3. 16-methyl-6α-chloro-15-dehydro-cortisone.
4. 16-methyl-6α-chloro-15-dehydro-cortisone 21-acetate.
5. 16-methyl-6α-chloro-15-dehydro-cortisone 21-propionate.
6. 16-methyl-6α-chloro-15-dehydro-prednisone.
7. 16-methyl-6α-chloro-15-dehydro-prednisone 21-propionate.
8. 16-methyl-6α-chloro-9α-fluoro-15-dehydro-cortisol 21-acetate.
9. 16-methyl-6α-chloro-9α-fluoro-15-dehydro-cortisone.
10. 16-methyl-6α-chloro-9α-fluoro-15-dehydro-cortisone 21-acetate.
11. 16-methyl-6α-chloro-9α-fluoro-15-dehydro-prednisolone 21-acetate.
12. 16-methyl-6α-chloro-9α-fluoro-15-dehydro-prednisone.
13. 16-methyl-6α-chloro-9α-fluoro-15-dehydro-prednisone 21-acetate.
14. 16-methyl-6α-chloro-9α-fluoro-15-dehydro-prednisone 21-propionate.
15. A compound of the formula

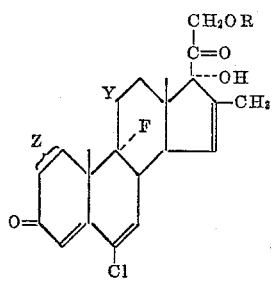

wherein R is selected from the group consisting of hydrogen and the acyl radical of a hydrocarbon carboxylic acid having up to 12 carbon atoms; Y is selected from the group consisting of =O and

and Z represents the linkage between C-1 and C-2 selected from the group consisting of single bond and double bond.

16. A compound of the formula

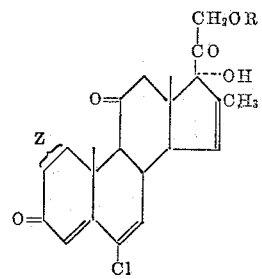

wherein R is selected from the group consisting of hydrogen and the acyl radical of a hydrocarbon carboxylic acid having up to 12 carbon atoms; and Z represents the linkage between C-1 and C-2 selected from the group consisting of single bond and double bond.

17. 16-methyl-6-chloro-9α-fluoro-6,15-bis dehydroprednisone 21-cyclopentylpropionate.
18. 16-methyl-6-chloro-6,15-bis-dehydro-cortisone.
19. 16-methyl-6-chloro-6,15-bis-dehydrocortisone 21-acetate.
20. 16-methyl-6-chloro-6,15-bis-dehydro-cortisone 21-cyclopentylpropionate.
21. 16-methyl-6-chloro-6,15-bis-dehydro-prednisone 21-propionate.
22. 16-methyl-6-chloro-6,15-bis-dehydro-prednisone 21-acetate.
23. 16-methyl-6-chloro-9α-fluoro-6,15-bis-dehydro-cortisol 21-acetate.
24. 16-methyl-6-chloro-9α-fluoro-6,15-bis-dehydro-prednisolone 21-acetate.
25. 16-methyl-6-chloro-9α-fluoro-6,15-bis-dehydro-cortisone.
26. 16-methyl-6-chloro-9α-fluoro-6,15-bis-dehydro cortisone 21-acetate.
27. 16-methyl-6-chloro-9α-fluoro-6,15-bis-dehydro-cortisone 21-cyclopentylpropionate.

No references cited.